United States Patent [19]

Jackson

[11] Patent Number: 4,992,408

[45] Date of Patent: Feb. 12, 1991

[54] CATALYST FOR USE IN EFFLUENT TREATMENT

[75] Inventor: Samuel D. Jackson, Darlington, England

[73] Assignee: Imperial Chemical Industries plc, London, England

[21] Appl. No.: 400,767

[22] Filed: Aug. 30, 1989

Related U.S. Application Data

[62] Division of Ser. No. 141,942, Jan. 11, 1988, Pat. No. 4,879,047.

Foreign Application Priority Data

[30]

Jan. 22, 1987 [GB] United Kingdom ............... 8701397

[51] Int. Cl.$^5$ .................... B01J 21/10; B01J 23/74
[52] U.S. Cl. .................... 502/328; 502/337; 502/340
[58] Field of Search .................... 502/328, 340, 337

[56] References Cited

U.S. PATENT DOCUMENTS

| | | | |
|---|---|---|---|
| 3,726,926 | 4/1973 | Brown et al. | 502/328 |
| 3,840,356 | 10/1974 | Bernusset et al. | 502/328 |
| 3,865,753 | 2/1975 | Broecker et al. | 502/328 |
| 3,886,091 | 5/1975 | Bertus | 502/328 |
| 3,992,166 | 11/1976 | Okagami et al. | 48/214 A |
| 4,094,821 | 6/1978 | McVicker et al. | 502/328 |
| 4,307,248 | 12/1981 | Barnett et al. | 502/328 |
| 4,331,566 | 5/1982 | Bjornson | 502/328 |
| 4,732,688 | 3/1988 | Bryan et al. | 423/579 |
| 4,861,746 | 8/1989 | Dishi et al. | 502/314 |
| 4,879,047 | 11/1989 | Jackson | 423/473 |

*Primary Examiner*—Anthony McFarlane
*Attorney, Agent, or Firm*—Cushman, Darby & Cushman

[57] ABSTRACT

A catalyst for decomposing an oxidizing agent, such as hypochlorite ions, in an effluent comprises an intimate mixture of at least one finely divided Group IIA oxide and finely divided nickel oxide, and/or hydrates thereof, supported on pieces of a non-porous substantially inert material. Some of the nickel may be replaced by cobalt. The Group IIA oxide forms 0.5 to 50% by weight of said intimate mixture. The nickel and Group IIA oxides may be applied by contacting the support with a solution of suitable salts, e.g. nitrates. Where the support is a Group IIA compound, e.g. magnesia, the Group IIA oxide may be incorporated into the intimate mixture by contacting the support with an acid solution of the nickel salt. In use the nickel oxide is oxidized to a higher oxidation state than NiO.

5 Claims, No Drawings

CATALYST FOR USE IN EFFLUENT TREATMENT

This application is a Divisional application of U.S. Pat. application Ser. No. 07/141942, filed 11 Jan. 1988, now U.S. Pat. No. 4,879,047.

This invention relates to a process of effluent treatment and in particular to a process of catalytically decomposing an oxidising agent in an effluent to be treated.

BACKGROUND OF THE INVENTION

Effluent from various industrial processes and sewage works contains a range of pollutants, both soluble and insoluble. The present invention provides a process of decomposing pollutants which are oxidising agents, and also utilising this process to destroy further pollutants by oxidation. There is a number of oxidising agents, for example hypochlorite and hydrogen peroxide that constitute a pollution hazard in effluents, mainly from industrial processes. In particular many industrial waste streams contain hypochlorite which is corrosive and toxic. Hypochlorite containing aqueous solutions are employed in bleaching operations and are produced, as a by-product, in the effluent from chlorine-producing brine electrolysis cells and by the scrubbing of chlorine gas. Decomposition of the hypochlorite ions is desirable before the effluent from such industrial operations is discharged into the public water system. In addition decomposition of hypochlorite ions in the effluent from a chlorine-producing brine electrolysis cell is desirable prior to discharge or recycle of the effluent to the electrolysis cell with fresh brine.

One method of decomposing hypochlorite ions has been to add to the effluent a reducing agent such as sulphite or bisulphite ions. This treatment can be very expensive when large quantities of effluent are involved. It has been proposed that heterogeneous fixed-bed catalysts should be used and a number of catalysts has been described in the literature, for example Kinosz, U.S. Pat. No. 3,965,249, discloses the use of oxides of cobalt, copper, nickel and calcium and Crawford et al, U.S. Pat. No. 4,297,333, disclose the use of a solid comprising nickel oxide and bimetal $NiCo_2O_4$ spinel.

EP-B-82915 discloses polymetal cobalt spinel catalysts which conform generally to the formula $M_x N_u Co_{3-(x+y)}O_4$ where M is at least one metal of Groups IB, IIA and IIB; N is at least one metal from Group IA; and x and y have certain values. In addition these polymetal cobalt spinel catalysts can further contain a modifier metal oxide which is selected from Groups IIIA, IIIB, IVA, IVB, VA, VB, VIA, VIIA and lanthanides and actinides. The use of the modifier metal oxide serves to provide an extender for, or to enhance or improve the adherence of the substituted cobalt spinel to the substrate on to which it is applied and to provide a tougher coating.

Clark et al., U.S. Pat. No. 4,400,304, disclose that there are certain drawbacks to the commercial application of such catalysts. It is stated that the high alkalinity of hypochlorite solutions causes the binder support of most tabletted and extruded catalysts to disintegrate. U.S. Pat. No. 4,400,304 proposes to overcome this problem by using finely divided oxides of certain metals, in particular cobalt, bound together with a speciality thermoplastic resin binder for example polyvinylidene fluoride. While this allows the catalyst to withstand alkaline conditions the cost of the speciality resin makes the catalyst composition expensive.

In another aspect of the art it has been proposed that the decomposition of a hypochlorite oxidising agent into oxygen atoms causes oxidation of pollutants in aqueous systems. Davis et al., U.S. Pat. No. 3,944,487, disclose that a granular, porous catalytic material of an oxide of nickel, cobalt, iron, or iridium can catalyse the decomposition of hypochlorite ions into oxygen atoms which oxidise pollutants in raw sewage. The catalytic material is stated to be regenerated by incineration.

SUMMARY OF THE INVENTION

The present invention relates to the treatment of effluent containing an oxidising agent, for example hypochlorite, whether said oxidising agent is part of the effluent from an industrial process or whether said oxidising agent is purposefully added in order to aid the oxidation of the pollutants.

The present invention avoids the necessity of providing an expensive speciality resin binder and provides a catalytic system of good activity and good stability.

Accordingly the present invention provides a process for decomposing an oxidising agent in an effluent to be oxidatively treated which comprises contacting said effluent with a catalyst bed comprising an intimate mixture of:

i) at least one finely divided oxide of an element of Group IIA of the Periodic Table, and ii) finely divided nickel oxide, and/or hydrates thereof, supported on pieces of a non-porous substantially inert material, said Group IIA oxide constituting 0.5 to 50% by weight of said intimate mixture (with the components thereof being expressed as the anhydrous divalent oxides).

DETAILED DESCRIPTION OF INVENTION

The catalyst bed comprises an intimate mixture of at least one finely divided Group IIA oxide and nickel oxide. Some of the nickel oxide or hydrate thereof may be replaced by cobalt oxide and/or hydrate thereof. The amount of cobalt oxide, if any, is preferably such that the cobalt:nickel atomic ratio is below 1.0. If cobalt oxide and/or hydrate thereof is incorporated, the Group IIA oxide constitutes 0.5-50% by weight of the combined weight of said cobalt, nickel, and Group IIA metal, oxides expressed as the anhydrous divalent oxides.

Suitable Group IIA elements include beryllium, magnesium, calcium, strontium, and barium. Magnesium, calcium, and barium are preferred and magnesium is especially preferred as it gives rise to particularly good activity.

The finely divided Group IIA oxide, for example magnesia, by itself has no significant catalytic activity in the process of the invention. However, when in intimate admixture with the finely divided nickel oxide, said Group IIA oxide has a significant promotor effect on the activity of said nickel oxide. Preferably the Group IIA oxide is present in the range 0.5-25%, more particularly 1.0-20%, for example 5% and 10%, by weight of the intimate mixture.

In the present invention the support material is pieces of non-porous materials. It has a surface area, measured by the Brunauer-Emmett-Teller method using nitrogen, of suitably less than 10, preferably less than 5, and in particular less than 1, $m^2.g^{-1}$. Preferably it has a pore volume of less than 0.1 ml.g$^{-1}$. The non-porous material can be any material that can support the intimate mixture and is substantially stable in the presence of the alkaline conditions under which the process is generally performed. Suitable support materials include chlorinated and fluorinated resins, metals such as palladium and platinum, film forming metals such as zirconium, and other materials such as graphite, mineral fibres, minerals such as calcium carbonate, magnesia, alumina, zirconia, spinels (for example magnesium spinel), and alumina-based ceramics, and mixtures thereof. Preferably the support is oxidic. The pieces of the support material can have a regular shape, for example as formed by pelleting or moulding an oxidic composition, for example gamma alumina, and firing the pelleted or moulded composition to provide a regular non-porous material. In an alternative the pieces of the support material can be made by fragmentation to provide irregular shapes and sizes of the non-porous oxidic material. Conveniently the pieces, either regular or irregular, have a maximum average dimension of less than 25 mm, preferably of less than 10 mm, for example about 1–3 mm. In one aspect the pieces may be the size of sand particles (fine, average or coarse-grained), for example having an average dimension of 0.1–0.5 mm.

The oxides of nickel (and cobalt, if present), may be obtained in finely divided form in any convenient manner. One suitable manner comprises contacting the non-porous support with an aqueous solution containing a nickel salt (and cobalt salt, if cobalt is desired), said salt or salts being decomposable by heat to form the oxides, and subsequently calcining the coated support to effect the decomposition of said salt or salts. Conveniently nitrates are employed. The Group IIA oxide conveniently can be incorporated, prior to contacting with the salt solution, by contacting the non-porous support with an aqueous solution containing a salt of a Group IIA element, said salt, for example a nitrate, being decomposable by heat to form an oxide and subsequently heating to form the Group IIA oxide. In a preferred method the Group IIA oxide, nickel oxide (and cobalt oxide, if desired) can be incorporated simultaneously by contacting the non-porous support pieces with an aqueous solution containing salts of the Group IIA element, nickel and optionally cobalt, said salts being decomposable by heat, and then calcining the dipped pieces In some cases it is possible to employ as the non-porous support a suitable Group IIA compound, eg magnesia, calcium carbonate or oxide, or barium oxide. Magnesia is preferred as it is readily available in a suitable non-porous, eg fused, state. Where the support is such a Group IIA metal compound, by the use of an acidic solution to apply the nickel salt (and cobalt salt if employed), it is possible to make the intimate mixture in situ as the acid in the nickel (and cobalt, if used) salt solution will dissolve sufficient of the Group IIA metal compound that, on drying and calcining, the requisite amount of Group IIA metal oxide is present in intimate admixture with the nickel (and cobalt, if present) oxide. The acid of the acidic nickel (and cobalt, if present) salt solution should of course be one that gives rise to a salt of the Group IIA metal that is decomposable to the oxide by calcination. A nitrate solution containing free nitric acid is particularly preferred.

In some cases the support material may contain acid leachable impurities, eg silicides. This can cause difficulties if the nickel (and cobalt, if required) and/or Group IIA metal oxides are applied by the above mentioned route of contacting with a salts solution if the latter is acidic, as is normally the case for reasons of stability of the salts solution, as on calcination, a deposit of compounds, eg silica, derived from the impurity may be formed which prevent, or hinder, access of the effluent to be treated to the intimate mixture.

In such cases it may be desirable to subject the support to an acid wash before application of the salts solution or solutions and/or to employ non-acidic salts solutions.

The calcination step can conveniently be carried out at temperatures in the range 200° C. to 600° C., more suitably in the range 400°–550° C.

The contacting of the support with the salts solutions and subsequent calcination steps can be performed more than once, if desired, in order to achieve the requisite loading level of the intimate mixture on the support. In order to improve the loading of the intimate mixture on to the support, the support surface can be roughened for example mechanically or by chemical etching.

The weight of the calcined intimate mixture is suitably in the range 0.25 to 15%, preferably 0.5 to 12%, particularly 1 to 10%, by weight of the combined weight of the support and intimate mixture.

In use, the catalyst bed is contacted with effluent containing oxidising agent which is to be oxidatively treated. Suitable oxidising agents include hypohalite ions, for example hypochlorite and hypobromite ions, hydrogen peroxide, and periodate ions. Some, at least, of such oxidising agents are pollutants in various industrial processes. In particular hypochlorite ions are a significant industrial pollutant as mentioned hereinbefore.

Conveniently the catalyst is formed into a bed in conventional manner and the effluent containing pollutant, for example hypochlorite ions, is passed through the bed. Generally the effluent is in the form of an aqueous solution which has been filtered prior to contact with the catalyst bed.

As mentioned hereinbefore, the process of decomposing pollutants which are oxidising agents can be utilised to destroy further pollutants by oxidation. In this way, with the deliberate addition of an oxidising agent for example hypochlorite ion, many orgnaic pollutants can be effectively and efficiently minimised. Such organic pollutants can be substantially decomposed oxidatively into carbon dioxide and water. Thus there is no further effluent treatment required as the oxidation products are harmless. Examples of effluent that can be treated include hydrocarbon chemical plant effluent, methanol manufacture effluent, dye plant wastewater, domestic sewage and the like. Examples of organic pollutants which can be present in such effluent, and which can be substantially removed by the process of the present invention include alcohols for example methanol and ethanol; chlorinated hydrocarbons for example chloroform, carbon tetrachloride and dichloromethane; cyanide; hydrazine; ammonia; formic acid; formaldehyde; amines for example methylamine; and sugars for example glucose.

Conveniently an aqueous solution of the oxidising agent for example hypochlorite, is prepared and admixed with the effluent to be treated. The mixture of effluent and oxidising agent is subsequently passed over the catalyst bed.

The amount of oxidising agent required to be admixed with the effluent for effective treatment thereof depends on a variety of parameters, including the COD (Chemical Oxygen Demand) of the effluent, the temperature at which the treatment is performed and the activity of the catalyst being used. The oxidising agent itself is a pollutant: however it is a particular benefit of the process that excess oxidising agent will be decomposed by the catalyst bed or, if desired, by passage through a further bed of the catalyst.

For the decomposition of the oxidising agent, either alone or in the presence of organic pollutants, the process of this invention is conveniently effected under conditions such that the pH level of the effluent is above 6, preferably above 8; it is a particularly beneficial aspect of the invention that the catalyst does not physically disintegrate even at pH levels in the range 10 to 13. The process can be performed at any convenient temperature, suitably in the range 5°–100° C., more suitably in the range 20°–80° C., for example at 30° C., 40° C. or 50° C.

In use the catalyst is contacted with the oxidising agent. On such contact in aqueous solution some or all of the oxides of the intimate mixture may become hydrated. In addition the nickel oxide, and cobalt oxide if present, are oxidised to higher valency states. For example nickel oxide can be notionally considered to be initially formed on the catalyst support as NiO. Authorities vary as to precisely what higher oxides of nickel are formed but it may be regarded that the higher oxides $Ni_3O_4$, $Ni_2O_3$ and $NiO_2$ are formed on contact with the oxidising agent. Such higher oxides are active in the process of the present invention. Thus the process of the present invention covers the oxides of nickel, cobalt if present, and the Group IIA element both as initially formed on the catalyst support and in their higher oxidation states, as formed in situ. As stated hereinbefore the present invention also covers the use of the oxides as hydrates It should be noted, however, that the proportions specified herein of the nickel oxide, cobalt oxide and Group IIA oxide, relative to each other and relative to the non-porous support are expressed on the basis of anhydrous oxides with the nickel, cobalt, and Group IIA oxides in the divalent state, ie NiO, CoO and MO, where M represents the Group IIA element.

As mentioned hereinabove the catalyst is oxidised by the oxidising agent to convert nickel oxide (and cobalt oxide, if present) to a higher oxidation state. If desired such oxidation can be effected prior to charging the catalyst to the vessel in which effluent is to be treated.

One particular application of the present invention is in decomposing hypochlorite ions present in the brine effluent from a chlorine producing electrolysis cell, prior to the recycling of the brine. In a preferred form of such an electrolysis process, the brine from the electrolysis cell is first acidified to a pH of less than 5 by the addition of an acid to assist the removal of dissolved chlorine. After the removal of dissolved chlorine, for example by physical means, alkali is added to adjust the pH to above 9 and the alkaline brine is recycled to the electrolysis cell together with fresh brine, sometimes after an ion-exchange step. The hypochlorite decomposition is effected after alkali addition and preferably before any ion exchange step. The hypochlorite decomposition may be effected before or after the addition of fresh brine. Typically in such a process the influent brine at the hypochlorite decomposition stage contains about 10 to 1000 ppm by weight of hypochlorite ion, about 5 to 30% by weight of sodium chloride, has a pH of about 9 to 12, and is at a temperature of about 70° to 90° C.

In another aspect of the invention the catalysts used in the present process are novel.

As stated hereinbefore, nickel oxide (and cobalt oxide if present) is oxidised prior to, or during, the process of this invention to an oxidation state such that R is greater than 2.4 where:

$$R = \frac{2(O) - (H)}{(X)}$$

wherein (O) and (H) represent the atomic proportions of oxygen and hydrogen, if any, respectively and (X) represents the atomic proportions of nickel (and cobalt, if present) in the nickel (and cobalt, if present) oxide or hydrate thereof. R thus represents the average valency state of the nickel (and cobalt, when present), in the composition.

Accordingly in a preferred aspect of the present invention there is provided an intimate mixture of at least one finely divided oxide of a Group IIA element and finely divided nickel oxide (and optionally finely divided cobalt oxide) and/or hydrates of said oxides, supported on pieces of a non-porous substantially inert material, said intimate mixture containing 0.5 to 50% by weight of said Group IIA oxide and the average oxidation state of said nickel (and cobalt, if present) oxides or hydrates is such that R, as defined hereinabove, is greater than 2.4.

As mentioned above the oxidation to the higher oxidation state may be effected before or during treatment of the effluent. The oxidation is preferably effected by contact of the supported intimate mixture with an aqueous solution containing hypochlorite ions.

Accordingly a further aspect of the invention provides a process for the manufacture of a material as specified above comprising applying a solution containing a nickel salt, (and optionally a cobalt salt), and a salt of a Group IIA metal to a non-porous support, said salts being decomposable by heating to the corresponding oxides, thereafter calcining the product to decompose said salts to oxides, and then treating the calcined product with an oxidising agent to oxidise the nickel (and cobalt, when present) oxide to a higher average oxidation state such that R, as hereinbefore defined, is above 2.4.

As previously mentioned, where the support is a non-porous Group IIA compound such as magnesia, the intimate mixture may be made in situ. Accordingly yet a further aspect of the invention provides a process for the manufacture of a material as specified above comprising applying a solution containing nickel, and optionally cobalt, nitrate and nitric acid to a non-porous magnesia support, thereby dissolving some of the magnesia to form magnesium nitrate, and thereafter calcining the product to decompose said nickel (and cobalt, when present) and magnesium nitrates to the respective oxides, and then treating the calcined product with an oxidising agent to oxidise the nickel (and cobalt, when present) oxide to a higher average oxidation state such that R, as hereinbefore defined, is above 2.4.

Suitable, preferred and particular catalysts of the present invention are as described hereinbefore with respect to the use of the catalysts in the process of the invention.

The invention is illustrated by the following Examples. In the following examples the hypochlorite decomposition activity was assessed in the following manner:

200 g (approx. 100 ml) of the coated chips were charged to glass tube of 2.5 mm internal diameter mounted vertically in an oil bath. An aqueous solution (pH 10.7) containing a specified concentration of hypochlorite ion introduced as sodium hypochlorite was continuously passed, usually at a rate of 1 liter.hr$^{-1}$, ie a LHSV (liquid hourly space velocity) of 10, through a preheating coil to the bottom of the glass tube, up the tube and then to drain. Ports were provided to take samples for analysis for the hypochlorite content when a steady state had been achieved. The amount of hypochlorite decomposed was able to be determined at various temperatures and flow rates. The temperature of the oil bath was controlled by a thermostat. The liquid feed rate was controlled by a peristaltic pump. After changing the temperature, flow rate, or hypochlorite concentration the system was allowed to achieve a steady state by waiting for at least 60 min. before taking samples.

The analysis for hypochlorite consisted of reaction with potassium iodide in dilute acetic acid, followed by titration of the liberated iodine with sodium thiosulphate using starch indicator.

EXAMPLE 1

Non-porous alpha alumina chips, having a pore volume of less than 0.1 ml.g$^{-1}$, obtained by fragmenting alumina that had been calcined at above 1600° C, and having a size such that 100% by weight pass through a 2.36 mm mesh and 93% by weight are retained on a 1.41 mm mesh, were dipped at room temperature into an aqueous solution containing, per liter, nickel nitrate hexahydrate (692 g) and magnesium nitrate (141 g). The dipped alpha-alumina chips were drained, dried, and then calcined at 475° C. for 3 hours. The dipping/calcination process was repeated twice more. The coating, ie the intimate mixture of nickel oxide and magnesium oxide contained about 11% by weight of magnesium oxide. The coating constituted about 3.2% by weight of the combined weight of the coating and support. This catalyst was designated catalyst A.

EXAMPLE 2

In a manner similar to that of Example 1, but using barium nitrate instead of magnesium nitrate, a catalyst (catalyst B) was prepared having a coating of nickel oxide (95% by weight) and barium oxide (5% by weight) on alpha-alumina chips. The weight of coating was about 4.4% of the combined weight of coating and support.

EXAMPLE 3

In a manner similar to that of Example 1, but including cobalt nitrate in the dipping solution, a catalyst (catalyst C) was prepared having a coating of nickel oxide (55%) by weight), cobalt oxide (40% by weight) and magnesium oxide (5%) by weight). The weight of coating was about 4.8% of the combined weight of coating and support.

For comparative purposes, catalysts (catalyst D and E) consisting of a coating of nickel oxide (catalyst D) and cobalt oxide (catalyst E) on alpha-alumina chips were prepared as in Example 1 but omitting the magnesium nitrate in the dipping solution.

The activity of the catalysts under various conditions is shown in the following table:

| Catalyst | OCl$^-$ inlet concentration (ppm) | °C. | exit OCl$^-$ concentration (ppm) | amount decomposed (%) |
|---|---|---|---|---|
| A (Ni/Mg) | 1000 | 30 | 60 | 94 |
| D (Ni) | 1000 | 30 | 343 | 66 |
| A (Ni/Mg) | 500 | 40 | none detected | >99 |
| B (Ni/Ba) | 500 | 40 | none detected | >99 |
| D (Ni) | 500 | 40 | 15 | 97 |
| C (Ni/Co/Mg) | 1000 | 40 | 34 | 97 |
| D (Ni) | 1000 | 40 | 138 | 86 |
| E (Co) | 1000 | 40 | 175 | 82 |
| A (Ni/Mg) | 1000* | 40 | 62 | 94 |
| B (Ni/Ba) | 1000* | 40 | 60 | 94 |
| D (Ni) | 1000* | 40 | 350 | 65 |
| B (Ni/Ba) | 50000 | 40 | 30000 | 40 |
| D (Ni) | 50000 | 40 | 36000 | 28 |

*Flow rate doubled to 2 litres · hr$^{-1}$

EXAMPLE 4

In a manner similar to that of Example 1, but using calcium nitrate instead of magnesium nitrate, a catalyst was prepared having a coating of nickel oxide((95% by weight) and calcium oxide (5% by weight) on alpha-alumina chips. The weight of coating was about 3.5% of the combined weight of coating and support.

The activity was assessed using a hypochlorite ion concentration of 1000 ppm by weight and a temperature of 40° C. Analysis showed that there was a first order rate constant for the decomposition of hypochlorite of 0.39. In comparison catalyst D had a first order rate constant of 0.29.

EXAMPLE 5

When any of the catlysts employed in Examples 1 to 4 are initially brought into contact with a solution containing an oxidising agent, eg hypochlorite ions, there is a period of increasing activity as the catalyst activates by being oxidised to a higher average oxidation state corresponding to an R value greater than 2.5. This is shown by the following table which illustrates the increase in activity with time from "start-up" for a typical catalyst, eg Catalyst A, in accordance with the invention.

| time from start-up (hours) | hypochlorite decomposed (%) |
|---|---|
| 1 | 80 |
| 2 | 92 |
| 3 | 97.5 |
| 4 | 98.5 |
| 6 | 99.5 |

X-ray photoelectron spectroscopic analysis of the catalysts before and after activation showed that the Ni 2p. binding energy had increased to a higher energy (858.4 eV) confirming that the valency of the nickel had increased from 2 to a value greater than 2.5.

EXAMPLE 6

Fused magnesia chips were boiled in 50% nitric acid for 30 minutes to remove any acid leachable materials. Subsequently the magnesia chips were coated with an acid nickel nitrate solution and fired to produce an intimate mixture of nickel oxide and magnesia in the coating. The weight of the coating was about 3.8% of the combined weight of the coating and support.

This catalyst was used to treat, at 70° C. and LHSV 20, an effluent stream containing 950 ppm by weight of sodium hypochlorite, together with sodium hydroxide and sodium chloride. After a steady state had been achieved the outlet sodium hypochlorite concentration was 0.2 ppm by weight. Catalyst A gave identical results, indicating that an intimate mixture of magnesia and nickel oxide had been formed as a coating on the magnesia support. This was confirmed by washing the coating with dilute nitric acid at pH 5 whereupon magnesia was leached from the surface layers.

We claim:

1. An intimate mixture of at least one finely divided oxide of a Group IIA element and at least one finely divided Group VIII element material selected from nickel oxide, mixtures of nickel oxide and cobalt oxide, and hydrates of said oxides, supported on pieces of non-porous substantially inert material, said intimate mixture containing 0.5 to 50% by weight of said Group IIA oxide and the oxidation state of said Group VIII element material is such that the average valency of said Group VIII element is greater than 2.4.

2. A process for the manufacture of an intimate mixture of at least one finely divided oxide of a Group IIA element and at least one finely divided Group VIII element material selected from nickel oxide, mixtures of nickel oxide and cobalt oxide, and hydrates of said oxides, supported on pieces of a non-porous substantially inert material, comprising applying a solution containing a salt of said Group VIII element, and a salt of a Group IIA metal to a non-porous support, said salts being decomposable by heating to the corresponding oxides, thereafter calcining the product to decompose said salts to oxides, and then treating the calcined product with an oxidizing agent to oxidize the oxide of said Group VIII element to a higher average oxidation state thereby forming said Group VIII element material, wherein the average valency of said Group VIII element is above 2.4.

3. A process according to claim 2 wherein said oxidizing agent is an aqueous solution containing hypochlorite ions.

4. A process for the manufacture of an intimate mixture of at least one finely divided oxide of a Group IIA element and at least one finely divided Group VIII element material selected from nickel oxide, mixtures of nickel oxide and cobalt oxide, and hydrates of said oxides, supported on non-porous magnesia support pieces comprising applying a solution containing a nitrate of said Group VIII element and nitric acid, to said non-porous magnesia support pieces, thereby dissolving some of the magnesia to form magnesium nitrate, and thereafter calcining the product to decompose said Group VIII element nitrate and magnesium nitrate to the respective oxides, and then treating the calcined product with an oxidizing agent to oxidize the oxide of said Group VIII element to a higher average oxidation state thereby forming said Group VIII element material, wherein the average valency of said Group VIII element is above 2.4.

5. A process according to claim 4 wherein said oxidizing agent is an aqueous solution containing hypochlorite ions.

* * * * *